DIGITAL SUPPRESSED CARRIER DEMODULATOR

Filed Aug. 26, 1965

INVENTORS
CHARLES Y. WAKAMOTO
LARRY L. WILSON
BY
Edward Dugas
AGENT

United States Patent Office 3,408,581

Patented Oct. 29, 1968

3,408,581

DIGITAL SUPPRESSED CARRIER DEMODULATOR

Charles Y. Wakamoto, Orange, and Larry L. Wilson, Placentia, Calif., assignors to North American Rockwell Corporation, a corporation of Delaware Filed Aug. 26, 1965, Ser. No. 482,684
6 Claims. (Cl. 329—50)

ABSTRACT OF THE DISCLOSURE

A digital suppressed carrier demodulator capable of generating a square wave or digital output from a modulated suppressed carrier input. The modulated suppressed carrier is fed into level detectors which provide "true" outputs to corresponding "AND" gates when the incoming carrier is at the respective detector's trigger level. These "true" signals are then "ANDed" with a clock pulse at the same frequency as the carrier reference signal. The outputs of the "AND" gates are applied to "set" and "reset" inputs of a flip-flop causing it to toggle with the modulation. The clock pulses are phased at a nominal 90° with respect to the carrier to provide assurance of a definite "true" signal from the level detectors.

This invention relates to a demodulator and more particularly to a circuit which operates upon a modulated suppressed carrier signal to provide a demodulated signal in digital form.

Control equipment such as servomechanisms, regulators, etc., require amplification of low frequency signals. One method of obtaining such amplification is to modulate a carrier signal of a relatively fixed high frequency with the low frequency signal and to reverse the phase of the high frequency carrier signal when the modulating signal changes polarity. A pre-amplifier is generally employed to raise the level of the modulated carrier signal; then a demodulator is used to convert the amplified signal to direct current. A filtering circuit and a regenerative switch follow the demodulator to retain the modulation and attenuate the carrier signal components. The regenerative switch is required for shaping the resultant output. A demodulation scheme as described is, of course, frequency limited due to the use of filters. There is a need in the control equipment art for a demodulator which will eliminate the need for filtering circuits, regenerative switches, and additional amplifiers that are used to raise the low level signal to a usable value after filtering. There is also a need for digital type demodulators because they are readily microminiaturized.

It is accordingly an object of the present invention to provide a demodulator which eliminates the need for filtering components.

It is another object of the present invention to provide a demodulator which is relatively frequency independent.

It is another object of this invention to provide an improved demodulator utilizing digital techniques.

These and other objects will become more apparent from the following description taken in conjunction with the accompanying drawings, in which.

Figure 1:
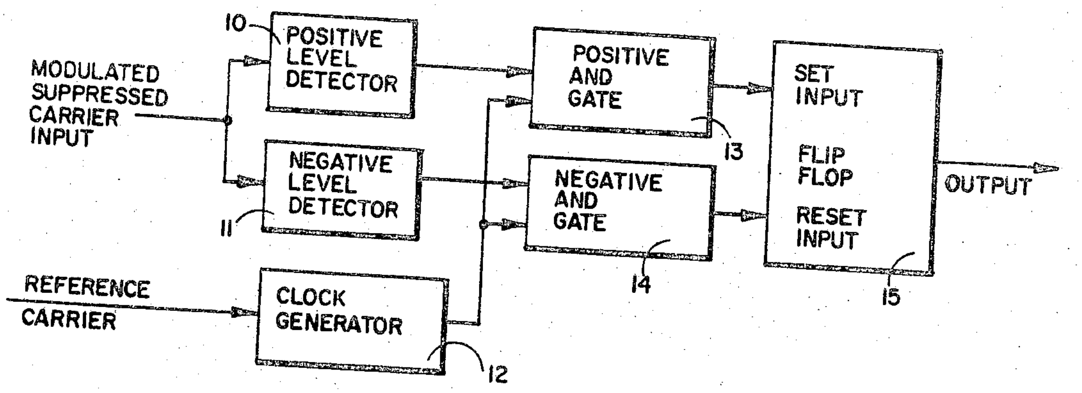
FIG. 1 is a block diagram of a preferred embodiment of this invention.

Referring to FIG. 1, a modulated suppressed carrier input signal (shown at FIG. 2*c*) is applied to positive level detector 10 and simultaneously to negative level detector 11. The modulated input signal varies symmetrically in amplitude about a reference point 0. When the amplitude of the modulated carrier signal is above the reference point, or positive in value, the positive level detector provides an output signal. When the amplitude of the modulated carrier signal is below the reference point, or negative in value, the negative level detector 11 provides an output signal. Level detectors 10 and 11 may be, for example, Schmitt Triggers which provide a TRUE level output signal when activated and a FALSE level signal at all other times.

Figure 2:
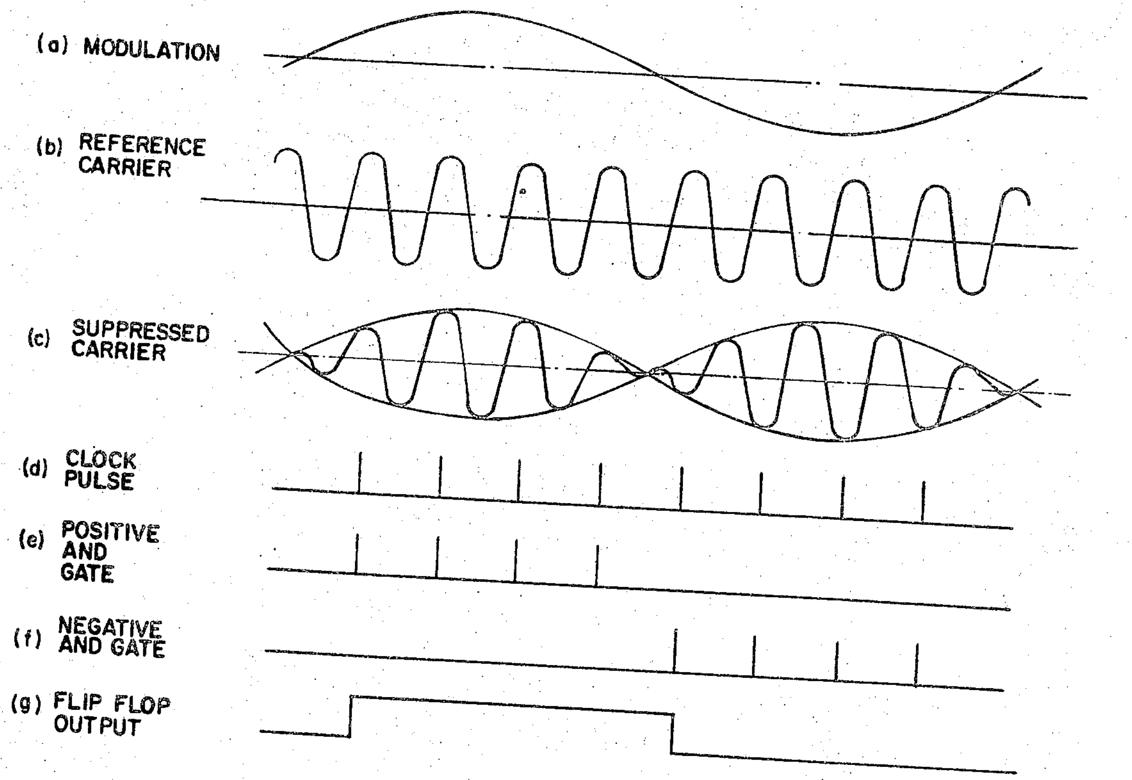
FIG. 2 illustrates the various waveforms present at selected points in the embodiment of FIG. 1.

The output from the positive level detector is connected to the input of positive AND gate 13 and the output from the negative level detector is connected to the input of negative AND gate 14. Also, connected as inputs to AND gates 13 and 14 is the output from clock generator 12. Clock generator 12 receives as an input the reference carrier signal (shown in FIG. 2*b*) and provides as an output a train of pulses (shown in FIG. 2*d*) having a repetition rate equal to the frequency of said reference carrier signal. In FIG. 2*d* the occurrence of the pulse train is during the peak positive amplitude of the reference carrier; the pulses could also be timed to occur at a 90 degree phase shift with respect to the carrier signal to provide assurance of a definite TRUE signal from the level detectors in the presence of quadrature noise effects and the like. The positive AND gate upon receiving simultaneously a pulse from clock generator 12 and an output signal from the positive level detector provides an output signal which may be a pulse such as shown in FIG. 2*e*. The output signal from AND gate 13 is applied to the set input of the bi-stable Flip-Flop 15 which causes the Flip-Flop to provide an output signal (shown in FIG. 2*g*) of a first stable state.

The negaitve AND gate upon receiving, simultaneously, a pulse from clock generator 12 and an output signal from the negative level detector provides an output signal which may be a pulse such as shown in FIG. 2*f*. The output from AND gate 14 is applied to the reset input of bi-stable Flip-Flop 15 which causes the Flip-Flop to provide an output signal (shown in FIG. 2*g*) of a second stable state. The output of bi-stable Flip-Flop 15 is, therefore, caused to toggle or change states as a function of the modulation signal of FIG. 2*a* which effectively is demodulating in digital form the modulated suppressed carrier waveforms of FIG. 2*c*. It is to be specifically noted that the modulated suppressed carrier signal of FIG. 2*c* changes phase (to indicate the polarity of modulation) as it passes through the reference point, but the reference carrier signal of FIG. 2*b* does not nor does the train of clock pulses derived from the reference carrier signal.

It will be obvious to those persons skilled in the electronic art that various polarities given to the waveforms and blocks for purposes of explanation of the particular embodiment may be reversed and altered without departing from the scope of the invention. It therefore is to be understood that all matters hereinbefore set forth or shown in the accompanying drawings is to be interpreted as illustrating and not in a limiting sense.

What we claim is:

1. A digital suppressed carrier demodulator for demodulating a modulated suppressed carrier signal having a symmetrical amplitude variation about a reference point comprising in combination:

means providing a train of pulses having a repetition rate equal to the frequency of said carrier signal;

means responsive to said modulated carrier signal and said train of pulses providing at a first output said train of pulses when the modulating signal is above said reference point and providing said train or pulses at a second output when the modulating signal is below said reference point; and bi-stable means responsive to said first and second outputs providing a first stable state output upon receipt of a pulse from said first output and providing a second stable state output upon receipt of a pulse from said second output so as to demodulate said modulated carrier signal.

2. The digital suppressed carrier demodulator of claim 1 wherein said responsive means is comprised of:

a first level detector for providing a signal when said modulated carrier signal is above said reference points;

a second level detector for providing a signal when said modulated carrier signal is below said reference point;

a first AND gate responsive to said first level detector signal and said pulse train providing a signal when said first level detector signal and a pulse from said pulse train occur simultaneously;

a second AND gate responsive to said second level detector signal and said pulse train providing a signal when said second level detector signal and a pulse from said pulse train occur simultaneously; and wherein said bi-stable means is responsive to the signals from said first and second AND gates providing said first stable state output signal upon receipt of a signal from said first AND gate and said second stable state output signal upon receipt of a signal from said second AND gate.

3. A digital suppressed carrier demodulator comprising in combination:

means responsive to a modulated suppressed carrier signal providing a first output pulse when said modulated carrier signal is above a predetermined level and a second output pulse when said modulated carrier signal is below a predetermined level;

means providing a train of pulses having a repetition rate equal to the frequency of said carrier signal source;

means responsive to said first and second output pulses and said train of pulses providing a third pulse when said first output pulse occurs simultaneously with one of said train of pulses and a fourth pulse when said second output pulse occurs simultaneously with one of said train of pulses; and bi-stable means responsive to said third and fourth pulses providing a first output of one stable state upon receipt of said third pulse and a second output signal of a second stable state upon receipt of said fourth pulse so as to demodulate said modulated suppressed carrier signal.

4. A digital demodulator for demodulating a modulated suppressed carrier signal comprising in combination:

a first level detector responsive to said modulated suppressed carrier signal providing a first signal when the amplitude of said modulated suppressed carrier signal is above a predetermined value;

a second level detector providing a second signal when the amplitude of said modulated suppressed carrier signal is below a predetermined value;

a clock generator providing a train of pulses having a repetition rate equal to the frequency of said carrier signal;

a first AND gate having as inputs said first signal and said train of pulses, said AND gate providing a signal when both of said input signals are in a similar state;

a second AND gate having as inputs said second signal and said train of pulses, said AND gate providing an output signal when both of said input signals are in a similar state; and bi-stable means responsive to the output of said first and second AND gates for providing an output signal having a first state upon receiving an output pulse from said first AND gate and providing an output signal having a second state upon receiving an output pulse from said second AND gate.

5. A digital suppressed carrier demodulator comprising in combination:

means responsive to a modulated suppressed carrier signal providing a first output pulse when said modulated carrier signal is above a predetermined level and a second output pulse when said modulated carrier signal is below a predetermined level;

means providing a train of pulses having a repetition rate equal to the frequency of said carrier signal and shifted in phase from said carrier signal by 90 degrees;

means response to said first and second output pulses and said train of pulses providing a third pulse when said first output pulse occurs simultaneously with one of said train of pulses and a fourth pulse when said second output pulse occurs simultaneously with one of said train of pulses; and bi-stable means responsive to said third and fourth pulses providing an output signal having one stable state upon receipt of said third pulses and a second stable state upon receipt of said fourth pulses so as to digitally demodulate said modulated suppressed carrier signal.

6. A digital suppressed carrier demodulator comprising in combination:

means responsive to a modulated suppressed carrier signal providing a first output signal when the amplitude of said modulated carrier signal is above said reference point and a second output signal when the amplitude of said modulated carrier signal is below said reference point;

means providing a train of pulses having a repetition rate equal to the frequency of said carrier signal, said pulses being phased with said carrier signal so as to occur at peak amplitudes of said carrier signal;

means responsive to said first and second output signals and said train of pulses providing a third signal when said first signal occurs simultaneously with a pulse from said pulse train and providing a fourth signal when said second signal occurs simultaneously with a pulse from said pulse train; and bi-stable means responsive to said third and fourth signals providing a first output of one stable state upon receipt of said third signal and a second output of a second stable state upon receipt of said fourth pulse so as to demodulate said modulated suppressed carrier signal.

References Cited

UNITED STATES PATENTS

| | | | |
|---|---|---|---|
| 3,165,584 | 1/1965 | Thornton et al. | 328—57 X |
| 3,244,986 | 4/1966 | Rumble | 328—118 X |
| 3,274,503 | 9/1966 | Peterson et al. | 328—118 X |

ALFRED L. BRODY, *Primary Examiner.*